(12) United States Patent
Witehira et al.

(10) Patent No.: US 6,906,762 B1
(45) Date of Patent: Jun. 14, 2005

(54) MULTI-LAYER DISPLAY AND A METHOD FOR DISPLAYING IMAGES ON SUCH A DISPLAY

(75) Inventors: Pita Witehira, Hamilton (NZ); Gabriel Damon Engel, Hamilton (NZ)

(73) Assignee: Deep Video Imaging Limited, Hamilton (NZ)

( * ) Notice: Subject to any disclaimer, the term of this patent is extended or adjusted under 35 U.S.C. 154(b) by 0 days.

(21) Appl. No.: 09/622,535

(22) PCT Filed: Jul. 10, 1998

(86) PCT No.: PCT/NZ98/00098

§ 371 (c)(1),
(2), (4) Date: Nov. 22, 2000

(87) PCT Pub. No.: WO99/42889

PCT Pub. Date: Aug. 26, 1999

(30) Foreign Application Priority Data

Feb. 20, 1998 (NZ) .................................................. 329817
Feb. 24, 1998 (NZ) .................................................. 329834

(51) Int. Cl.[7] .............................................. G02F 1/13
(52) U.S. Cl. ........................................................ 349/73
(58) Field of Search .......................................... 349/73

(56) References Cited

U.S. PATENT DOCUMENTS

| | | |
|---|---|---|
| 2,543,793 A | 3/1951 | Marks |
| 2,961,486 A | 11/1960 | Marks |
| 3,536,921 A | 10/1970 | Caulfield |
| 3,605,594 A | 9/1971 | Gerritsen |
| 3,622,224 A * | 11/1971 | Wysocki et al. ............... 349/83 |
| 3,891,305 A | 6/1975 | Fader |
| 3,918,796 A | 11/1975 | Fergason |
| 3,955,208 A | 5/1976 | Wick et al. |
| 3,992,082 A | 11/1976 | Katz |
| 4,165,922 A | 8/1979 | Morrissy |

(Continued)

FOREIGN PATENT DOCUMENTS

| | | |
|---|---|---|
| EP | 0 195 584 A2 | 9/1986 |
| EP | 0 336 351 | 10/1989 |
| EP | 0 454 423 A1 | 10/1991 |
| GB | 1 448 520 | 9/1976 |
| JP | 56-7916 | 1/1981 |
| JP | 57-119389 | 7/1982 |
| JP | 05-142515 | 6/1983 |
| JP | 60-103895 | 6/1985 |
| JP | 60-233684 | 11/1985 |
| JP | 60-244924 | 12/1985 |
| JP | 61-166524 | 7/1986 |
| JP | 61-200783 | 9/1986 |
| JP | 62-122494 | 3/1987 |
| JP | 62-161294 | 7/1987 |
| JP | 62-191819 | 8/1987 |
| JP | 62-191820 | 8/1987 |
| JP | 63-039299 | 2/1988 |
| JP | 63-067094 | 3/1988 |
| JP | 63-100898 | 5/1988 |
| JP | 63-203088 | 8/1988 |
| JP | 63-274918 | 11/1988 |
| JP | 03-101581 | 4/1991 |
| JP | 03-233548 | 10/1991 |

(Continued)

OTHER PUBLICATIONS

Kozo, T. "Three–Dimentional Display System by Laminated Liquid Crystal Display Device", Patent Abstracts of Japan 02–262119 A, vol. 15, No. 19, pp. 1153, (Jan. 16, 1991).

(Continued)

Primary Examiner—James A. Dudek
(74) Attorney, Agent, or Firm—Finnegan, Henderson, Farabow, Garrett & Dunner L.L.P.

(57) ABSTRACT

A display comprising of multi-levels of screens, each screen being selectively transparent with the ability to display images. A method of defining screen layers for upon which to display image on by using sequential time based pixel change as a variable which defines layer.

32 Claims, 7 Drawing Sheets

U.S. PATENT DOCUMENTS

| | | | |
|---|---|---|---|
| 4,190,856 A | | 2/1980 | Ricks |
| 4,281,341 A | | 7/1981 | Byatt |
| 4,294,516 A | | 10/1981 | Brooks |
| 4,333,715 A | | 6/1982 | Brooks |
| 4,472,737 A | | 9/1984 | Iwasaki |
| 4,541,692 A | | 9/1985 | Collins et al. |
| 4,670,744 A | * | 6/1987 | Buzak ............................ 345/6 |
| 4,736,214 A | | 4/1988 | Rogers |
| 4,792,850 A | * | 12/1988 | Liptoh et al. .................. 348/57 |
| 5,032,007 A | | 7/1991 | Silverstein |
| 5,086,354 A | | 2/1992 | Bass et al. |
| 5,107,352 A | | 4/1992 | Fergason |
| 5,132,839 A | | 7/1992 | Travis |
| 5,132,878 A | | 7/1992 | Carey |
| 5,557,684 A | | 9/1996 | Wang et al. |
| 5,589,980 A | | 12/1996 | Bass et al. |
| 5,689,316 A | * | 11/1997 | Hattori et al. ................. 349/74 |
| 5,745,197 A | * | 4/1998 | Leung et al. .................. 349/77 |
| 5,764,317 A | * | 6/1998 | Sadovnik et al. .............. 349/5 |
| 5,956,180 A | | 9/1999 | Bass et al. |
| 5,990,990 A | * | 11/1999 | Crabtree ....................... 349/74 |
| 6,100,862 A | * | 8/2000 | Sullivan ....................... 345/88 |
| 6,147,741 A | * | 11/2000 | Chen et al. .................. 349/202 |
| 6,414,728 B1 | * | 7/2002 | Faris et al. .................... 349/10 |

FOREIGN PATENT DOCUMENTS

| | | |
|---|---|---|
| JP | 04-034521 | 2/1992 |
| JP | 04-034595 | 2/1992 |
| JP | 05-007373 | 1/1993 |
| JP | 05-091545 | 4/1993 |
| JP | 06-233326 | 8/1994 |
| JP | 07-209573 | 8/1995 |
| JP | 07-222202 | 8/1995 |
| JP | 08-076139 | 3/1996 |
| JP | 09-043540 | 2/1997 |
| JP | 09-096789 | 4/1997 |
| JP | 09-133893 | 4/1997 |
| JP | 09-102969 | 5/1997 |
| JP | 10-312033 | 11/1998 |
| WO | WO 91/12554 | 8/1991 |
| WO | WO 91/15930 | 10/1991 |
| WO | 92/09003 | 5/1992 |
| WO | WO 98/04087 | 1/1998 |
| WO | WO 98/16869 | 4/1998 |

OTHER PUBLICATIONS

Minoru, T. "Displaying Method for Stereoscopic Image Using Liquid Crystal Display Element", Patent Abstracts of Japan 62–235929 A, vol. 12, No. 102, pp. 684, (Apr. 5, 1998).

Hattori, T. et al. "Spatial Modulation Display Using Spatial Light Modulators", Optical Engineering, vol. 31, No. 2, pp. 350–352, (Feb. 1992).

Blundell et al., "Volumetric Three–Deminsional Display Systems", pp. 1–7.

Buzak, "CRT Displays Full–color 3–D Images".

Cole et al., "A Three–Dimensional Display for Radar Returns", pp. 52–53.

L.F. Hodges et al., "True Three–Demensional CRT–Based Displays," Infor. Display, pp. 18–22 (May 1987).

Tamura et al., "Multilayer 3–D Display Adapter", Applied Optics, vol. 17, No. 23, pp. 3695–3696 (Dec. 1, 1978).

"Kodak Datashow HR/M Projection Pad", Motion Picture & Audiovisual Products, Eastman Kodak Co., 1988.

Alampiev et al., "Technology of the Three Dimensional Electronic Matrix for Liquid Crystal Display" Jan. 1, 1976.

General Electric, "3–D Liquid Crystal Display for Mine Detecting Radar" Apr. 1, 1974.

Technical Report of the Institute of Television Engineers of Japan, vol. 20, No. 5, Feb. 1996.

\* cited by examiner

MULTI-LAYER DISPLAY AND A METHOD FOR DISPLAYING IMAGES ON SUCH A DISPLAY

TECHNICAL FIELD

This invention relates generally to display devices and more particularly, to a display structure comprising multi-layered images and a method of extracting depth from two dimensional video data to display on such a device.

BACKGROUND ART

Conventional display devices present images on a two dimensional screen. Common displays are cathode ray tubes (CRTs), liquid crystal displays (LCDs), Field Effect Displays (FEDs), and projection displays, among others. Various attempts have been made to incorporate the illusion of depth on two dimensional displays. These methods achieve the illusion of depth by presenting separate images to each eye of the viewer.

The main methods of achieving the illusion of depth have been stereoscopic and auto-stereoscopic displays.

Stereoscopic displays generally use composite images which are split into two images by glasses worn by the viewer. Each eye piece in the glasses will allow certain characteristic light patterns through to each individual eye. Popular methods of achieving this are through the use of polarisation, shutter glasses, defraction grating, multi colour lens, and dual screen head mounted displays.

Auto-stereoscopic displays do not use glasses but instead generally use a lens configuration in which stereo images on a screen are aligned through lens or optical grating to focus in the general area of the viewers' individual eyes.

One main problem associated with these displays reside in the inability to gain convergence of stereo images to match the distance between the viewers' eyes. Incorrect convergence leads to disorientation and possible nausea when viewed for extended periods. In the case of most auto-stereoscopic displays the viewing area is limited to the focal length of the lens used. This limits the number of simultaneous viewers of a single screen. Traditional auto stereo-scopic displays are limited to one or two simultaneous viewers. While, traditional stereoscopic displays require all users to wear glasses. In addition each of these methods require head tracking devices to be incorporated in order to achieve motion parallax.

Certain designs have been made that use multiple levels of images.(U.S. Pat. No. 4,736,214) These designs incorporate reflected images from single or multiple sources. The reflected images of these designs produce "ghostly" multi layered images, which are generally unacceptable for normal lighting conditions.

Images transmitted to these display devices via antenna, VCR, cable etc. are generally compressed during transmission. It is common for these compression algorithms to compress based on pixel change between consecutive frames.

It is an object of the present invention to address the foregoing problems or at least to provide the public with a useful choice.

Further aspects and advantages of the present invention will become apparent from the ensuing description which is given by way of example only.

DISCLOSURE OF INVENTION

It is the purpose of this invention to specify a display which improves upon the limitations of display devices mentioned above, while incorporating actual depth.

According to the present invention depth is created by combining multiple layers of selectively transparent screens. Each screen is capable of showing an image. Each foreground screen is also capable of becoming transparent.

The preferred embodiment of this invention creates an improved display device incorporating depth, by combining multi-layers of selectively transparent screens to create true depth while incorporating common compression algorithms to extract images into separate channels to be displayed on each screen of the multi-layered display. Implementation of multiple techniques have been used to achieve this end, which solve many problems exhibited in the prior art.

Reference throughout this specification will now be made to the present invention as utilising LCDs for each screen layer. However, it should be appreciated by those skilled in the art that other types of screens that can selectively show an image and selectively become transparent may be used in conjunction with the invention, not necessarily being LCDs.

In a preferred embodiment of the present invention the screens are aligned parallel to each other with a pre-set distance between them. This distance depends on the level of desired depth related to the screen sizes. Typically this distance is ¼ the vertical height of the front screen although the actual distance may be changed to fit the desired effect. The distance between screens may also be varied in real time to enhance the effect.

Images displayed on the screen furthest from the viewer (background screen) will appear at some depth behind images displayed on the screen closest to the viewer (foreground screen). The transparent portions of the foreground screen will allow viewers to see images displayed on the background screen.

This arrangement of layering multiple screens allows images to be presented at multiple levels giving the viewer true depth without use of glasses or lens. It also allows for motion parallax without head tracking devices.

Additional layers may be added to give greater depth to the display.

In addition a refractor may be placed between the screens to increase viewing angle. This refraction layer bends light such that viewing angle is increased to the fill size of a screen placed in front of the refractor. The refractor may be a parallel sheet of optically clear material or any other type of lens including frensel lens.

If the foreground screen device chosen requires a polarised light source to display an image then that polarised light source may emanate from a background screen. This is accomplished by placing a polarisation sheet in front of a non-polarised screen or using a polarised light output display such as an LCD as the background screen.

Polarised light emanating from a background screen allows a foreground screen of LCD structure to remove its rear polariser while still displaying an image. This is due to the fact that the background screen provides the polarised light necessary to produce a viewable image on the foreground screen.

Removing the number of polarisers in an LCD configuration has the advantage of reducing the number of components and increasing the brightness of the display.

In such a configuration the foreground image will no longer appear on the foreground screen if the polarised source is blocked. By placing a highly diffuse material between the polarised light source and the foreground screen the foreground images will disappear where the polarised light is blocked. This gives the illusion that the foreground image displayed is passing behind the diffusion source. To enhance the effect the diffuser may also contain an image.

For example, the foreground screen displays an arrow moving from the left to the right of the screen. In between the foreground screen and the polariser is placed an image of an apple printed on a diffuse material. When the arrow is in a position to have its polarised light source blocked by the diffusion material it will appear to fall behind the apple imprinted on such diffusion device.

By using a selective diffuser in place of the diffusion material one may selectively diffuse images presented on the rear screen allowing for infinite depth to be conveyed.

When multiple layered LCDs are used the polarisers of said LCDs must align in such a way that the polarisation angle of the background LCD aligns with the polarisation angle of the rear of a foreground LCD. Aligning polarisers is not necessary in cases where high brightness is desired or if the foreground image can be inverted. In this case an inverted foreground image will appear non inverted (inverse of an inverted image=non inverted image).

It may be necessary in certain screen combinations to include a slightly diffuse layer to eliminate moiré interference patterns. This has the additional effect of eliminating the need to align polarisers and increasing angle of view.

Each layer of the display will have an individual video signal. These signals may originate from separate sources or be extracted from a single source conventional signal.

In a two layer display using separate sources the background may be transmitted as a signal and the foreground transmitted as a second signal to their respective screen. For example, the background image may be of a mountain and the foreground image of a car passing in front of the mountain.

Separate sources may be filmed with multiple conventional cameras, or three dimensional cameras, or blue screen, or chroma key or alpha channel or any combination of industry standard cameras.

Single source depth extraction may be performed using conventional compression algorithms used in transmission of video data. Prior Art video compression algorithms commonly utilise pixel change between consecutive frames in order to reduce the bandwidth of the data transmitted. This data on pixel change taken from the video compression algorithm can be used to extract depth based on the amount of change each pixel undergoes.

Compressed signal is sent to display where video streams to each layer are extracted from the signal based on pixel change.

For example, a standard video may be made of a car passing a mountain. The camera is fixed such that the car passes the field of view while the mountain remains still in the frame.

In such a video the pixels representing the passing of the car will change whereas the pixels representing the mountain will remain constant. Thus, the pixels with the most change (car) will be assigned to the foreground screen where the pixels with the least change (mountain) will be assigned to the background screen.

It should be understood that portions of this summary devoted to polarisation are not limited to LCD structures as it can be easily understood by those skilled in the art that other non polarised displays may be adapted to incorporate certain polarisation characteristics if so desired.

Further more, it is easily understood by those skilled in the art that the above summary covers the use of all screen types not only LCDS. The only requirement for the screen type is an ability to be transparent. As such it should be understood to cover, but is not limited to Projection, CRT, FED and LCD screens.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

In the following, detailed descriptions of the preferred embodiments of this invention are revealed. Although a complete specification is revealed it should be understood by those skilled in the art that each aspect of the preferred embodiments may be used independently or in conjunction with other illustrations of this invention while still conforming to the general specification of a multi-layered display device.

The preferred embodiments of this invention create an improved display device incorporating depth, by combining multi-layers of selectively transparent screens.

Figure 1:
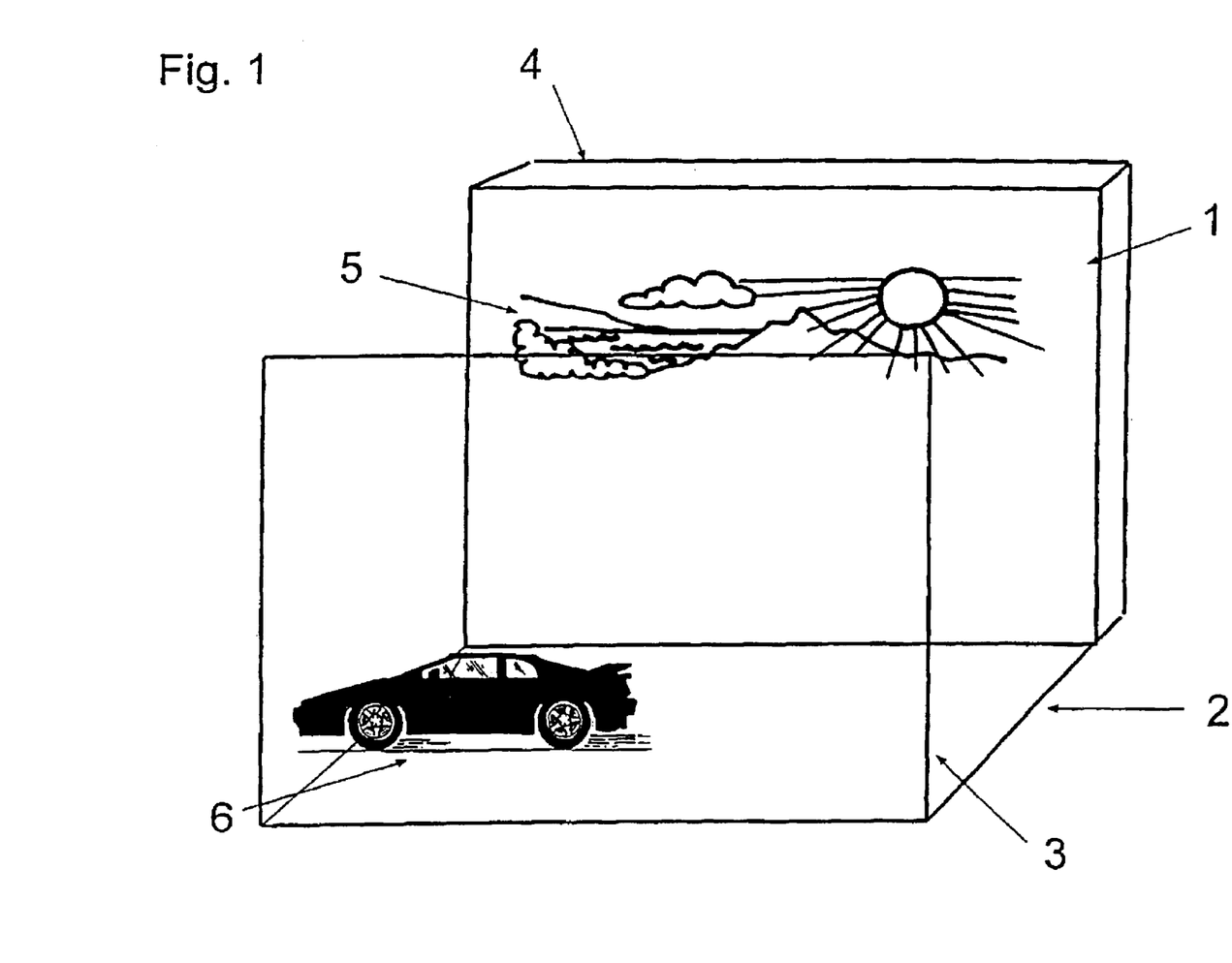
FIG. 1 is a diagrammatic view of a basic multi-layered display in accordance with one embodiment of the present invention.

A simplified multiple layered image display is shown in FIG. 1. A background screen 1 is placed at some distance 2 behind a foreground screen 3. In some display types such as LCDs back lighting 4 may be required. Each screen is capable of showing images 5, 6. Images displayed on the foreground screen 6 appear to be closer than images shown on the background screen 5.

Figure 2:
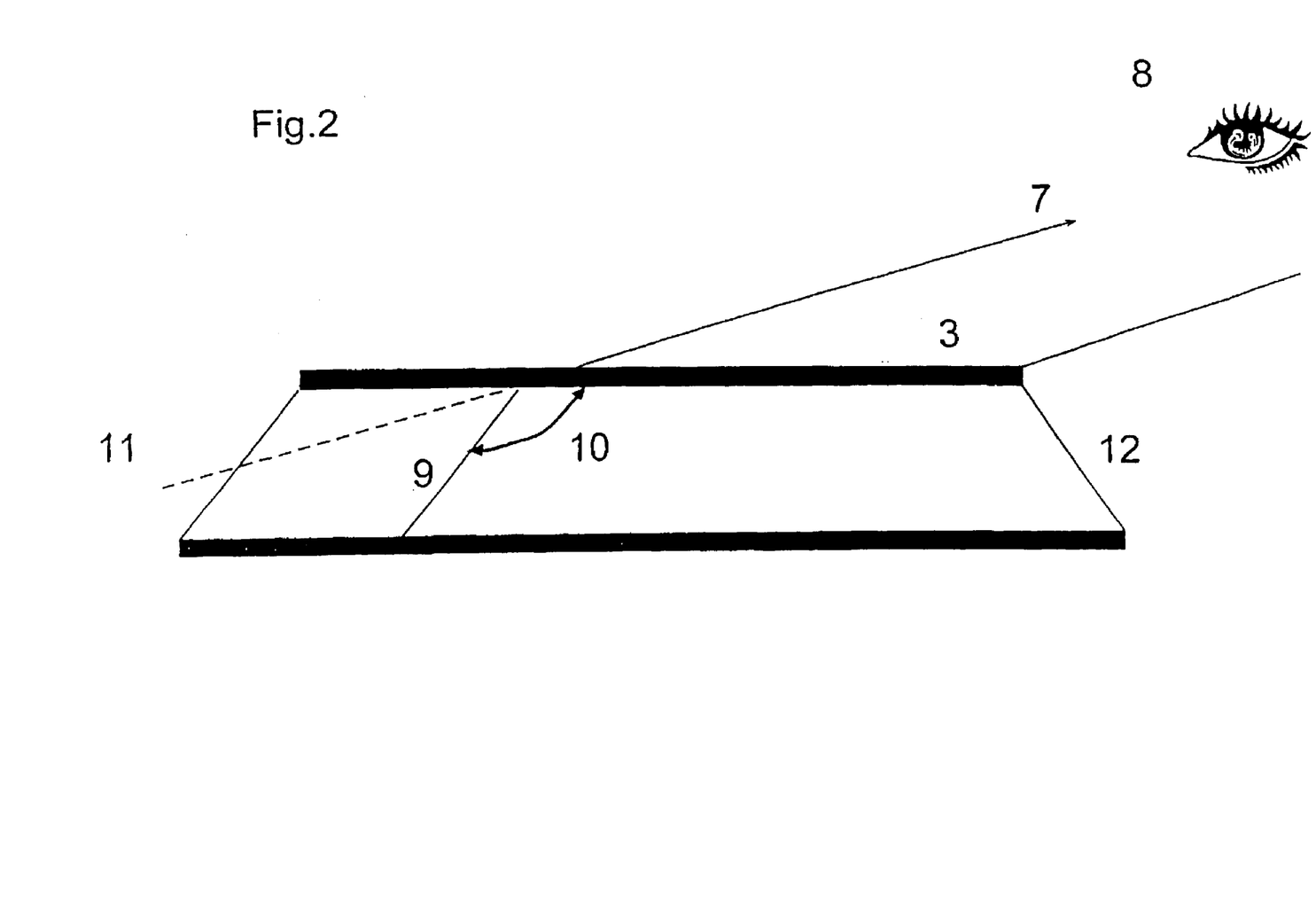
FIG. 2 illustrates a multi-layered screen with a refractor in accordance with one embodiment of the present invention.

The addition of a refractor placed between screens is represented in FIG. 2. Light 7 transmitted to the viewer 8 is bent to 9 at refraction angle 10 of the material such that the edge of the rear screen is not seen from any angle of view. Without the refraction of light the edge of the rear screen would be clearly seen 11 from any angle less than 90 degrees.

For minimum distortion a sheet of parallel optically clear material such as glass or acrylic may by used as a refractor 12. Such a refractor would restrict the front screen 3 to being of a smaller size than the background screen 1. In a preferred embodiment of the present invention the foreground screen size would have its edge no less than 135 degrees from the edge of the rear screen.

In another preferred embodiment the refractor may be a lens including but not limited to frensel. In this embodiment the screens may be of similar size.

Figure 3:
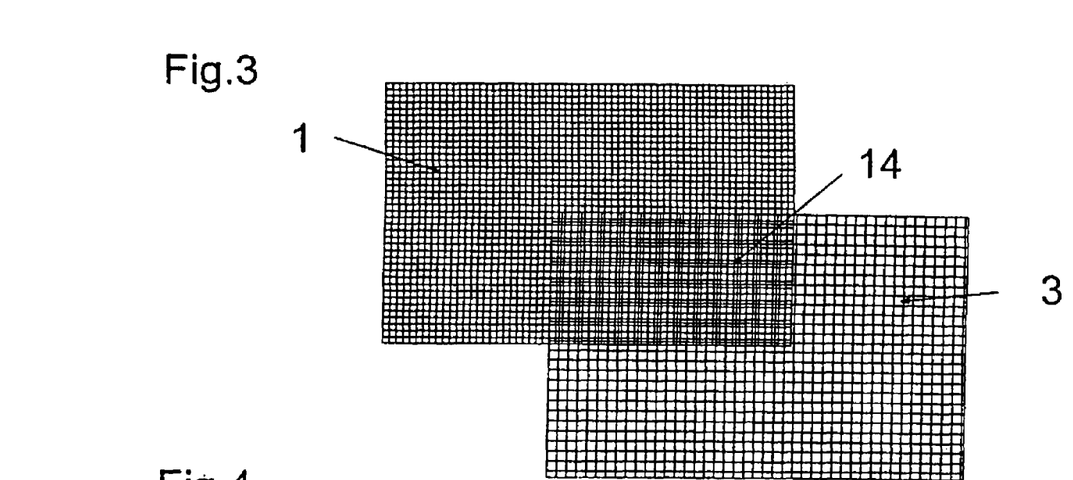
FIG. 3 illustrates the moiré interference pattern in multi-layered displays in accordance with one embodiment of the present invention.
Figure 4:
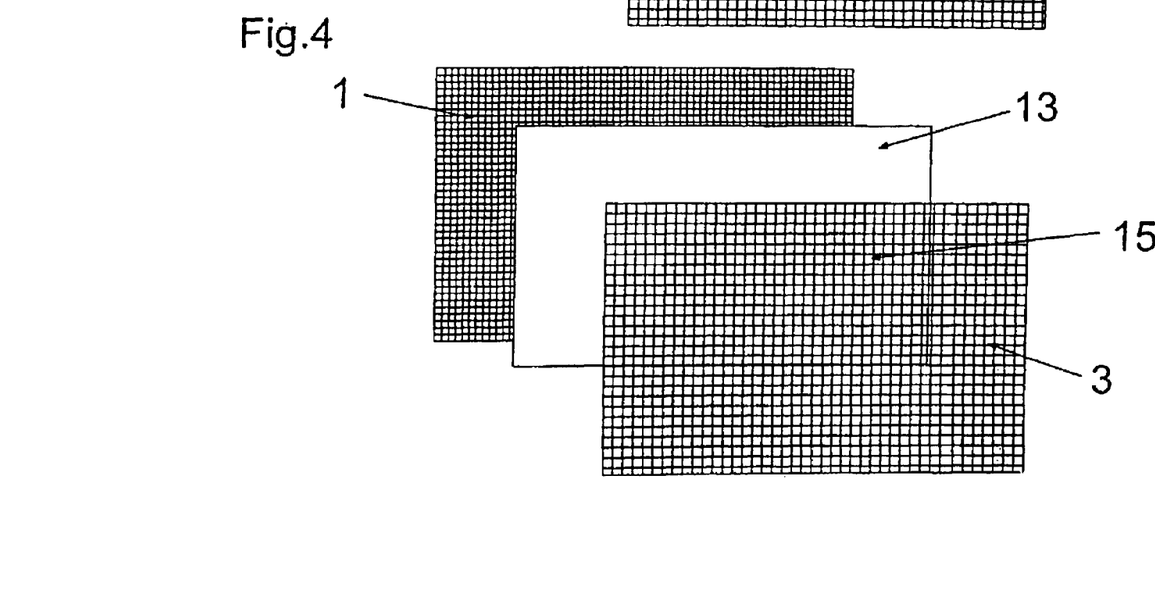
FIG. 4 illustrates a diffuser and its effect on the moiré interference pattern in accordance with one embodiment of the present invention.

The addition of a slightly diffuse layer 13 placed between screens is shown in FIG. 4. Without this layer, interference 14 is created by the combination of slightly different pixel patterns of subsequent screen layers. Placing the diffusion layer 13 between screens slightly diffuses the pixel pattern in each screen eliminating interference 15.

Alternately interference can be eliminated by using a stripe pixel pattern on one screen and a 45 degree diagonal pixel pattern on another.

Figure 5:
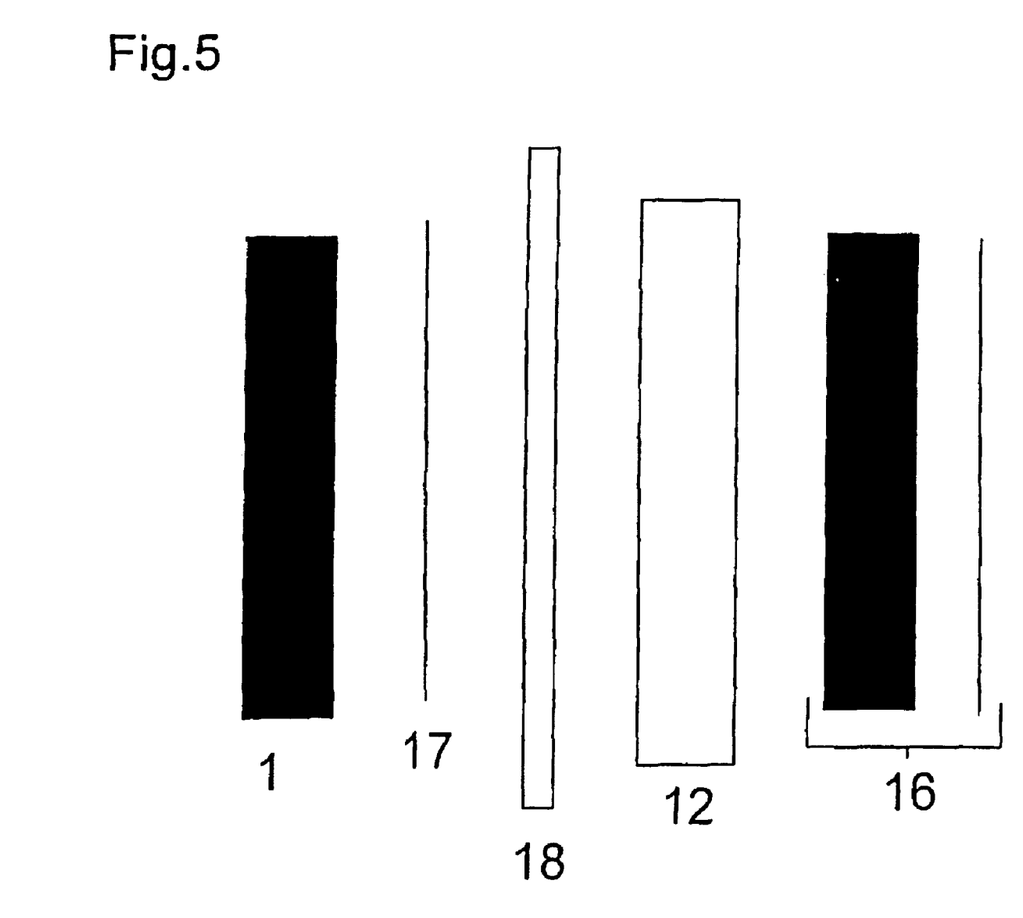
FIG. 5 illustrates a multi-layer display with added depth in accordance with one embodiment of the present invention.

For further clarification a complete assembly is shown in FIG. 5. This combination produces a display with a finite true depth defined by the distance between screens 1 and 16. It also creates an infinite depth illusion with the addition of a selective diffuser 18.

A polariser sheet 17 is placed at the front of the rear screen 1. This creates a polarised light source. Alternately the rear screen could also be an LCD with a polarised output. In front of the polariser is placed a selective diffuser 18. In front of the diffuser is a refractor 12. In front of the refractor is placed a LCD 16 without a rear polariser.

When the selective diffuser is set to transparent, the rear screen outputs polarised light to allow an image on the foreground screen to be visible.

Figure 6:
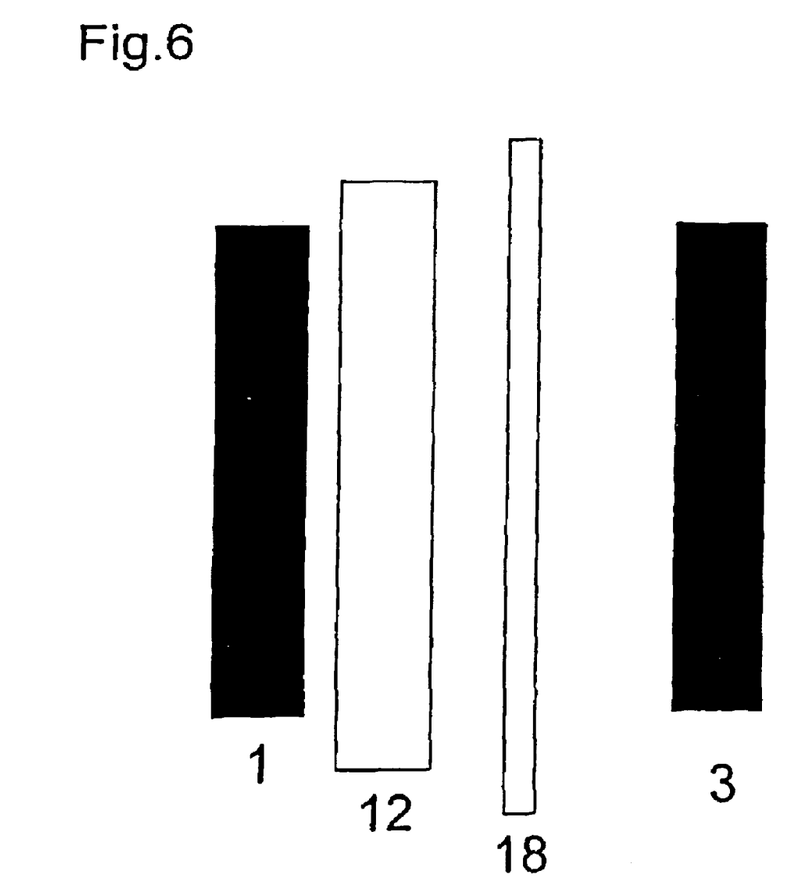
FIG. 6 illustrates a multi-layered display with added clarity in accordance with one embodiment of the present invention.

With certain screen technologies such as LCD it is desirable to have the ability to render the foreground screen opaque. This preferred embodiment is represented in FIG. 6. This combination produces a display in which the foreground screen is rendered opaque. In this configuration the rear screen 1 is followed by a refractor 12 which is followed by a selective diffuser 18 which in turn is followed by the foreground screen 3. To make images on the foreground screen opaque the selective diffuser is selected to diffuse the area behind the area selected to be opaque.

Figure 7:
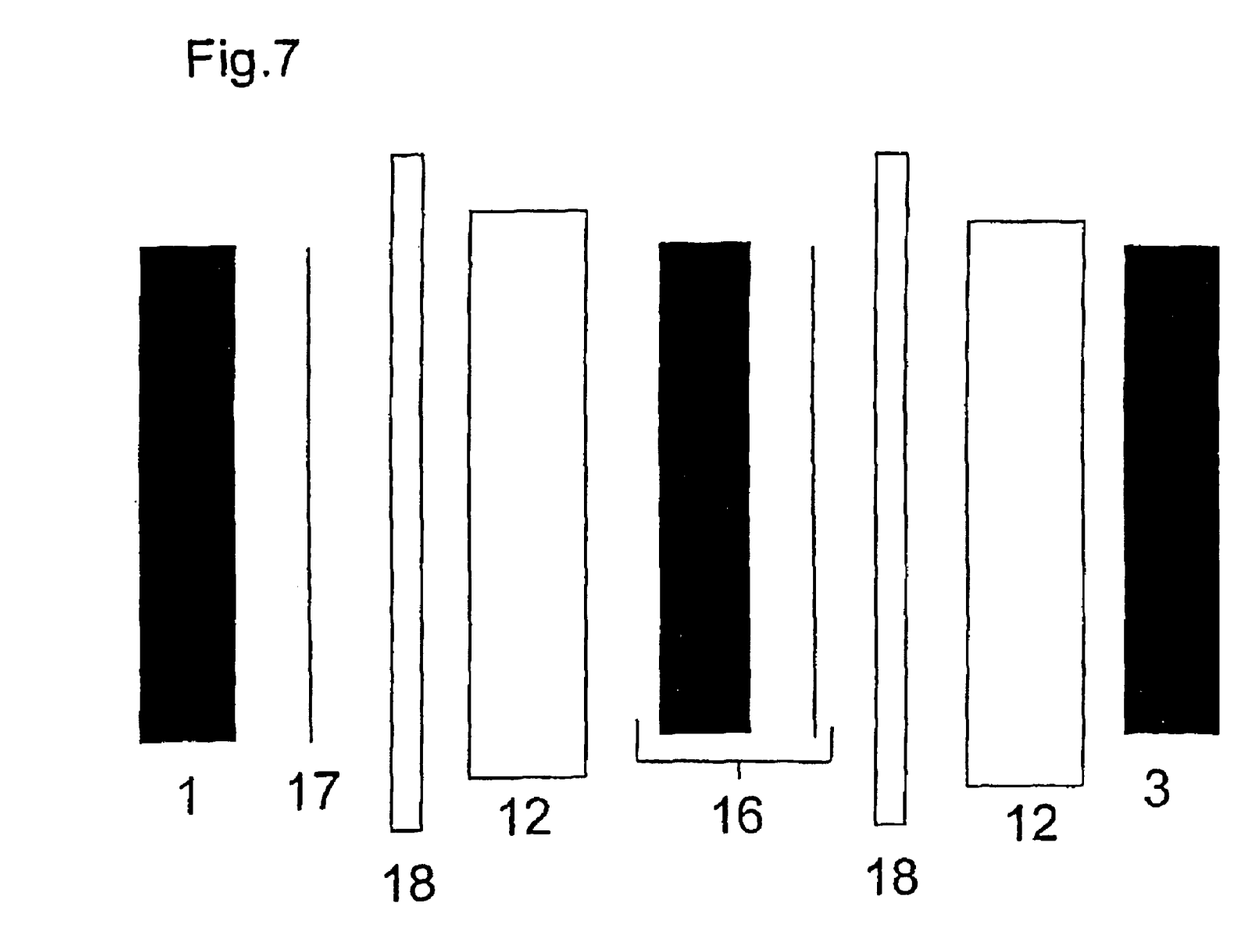
FIG. 7 illustrates a tri-level display in accordance with one embodiment of the present invention.

In yet another embodiment of the present invention FIG. 7 represents a Tri-layer display incorporating most of the previously mentioned techniques. This display provides three finite depth planes with the foremost screen 3 being selectively opaque due to the selective diffuser 18 placed behind it. The middle LCD screen 16 would have infinite depth due to its lack of rear polariser and the ability of the selective diffuser 18 in front of the rear polariser 17 to diffuse polarised light required for its operation.

Figure 8:
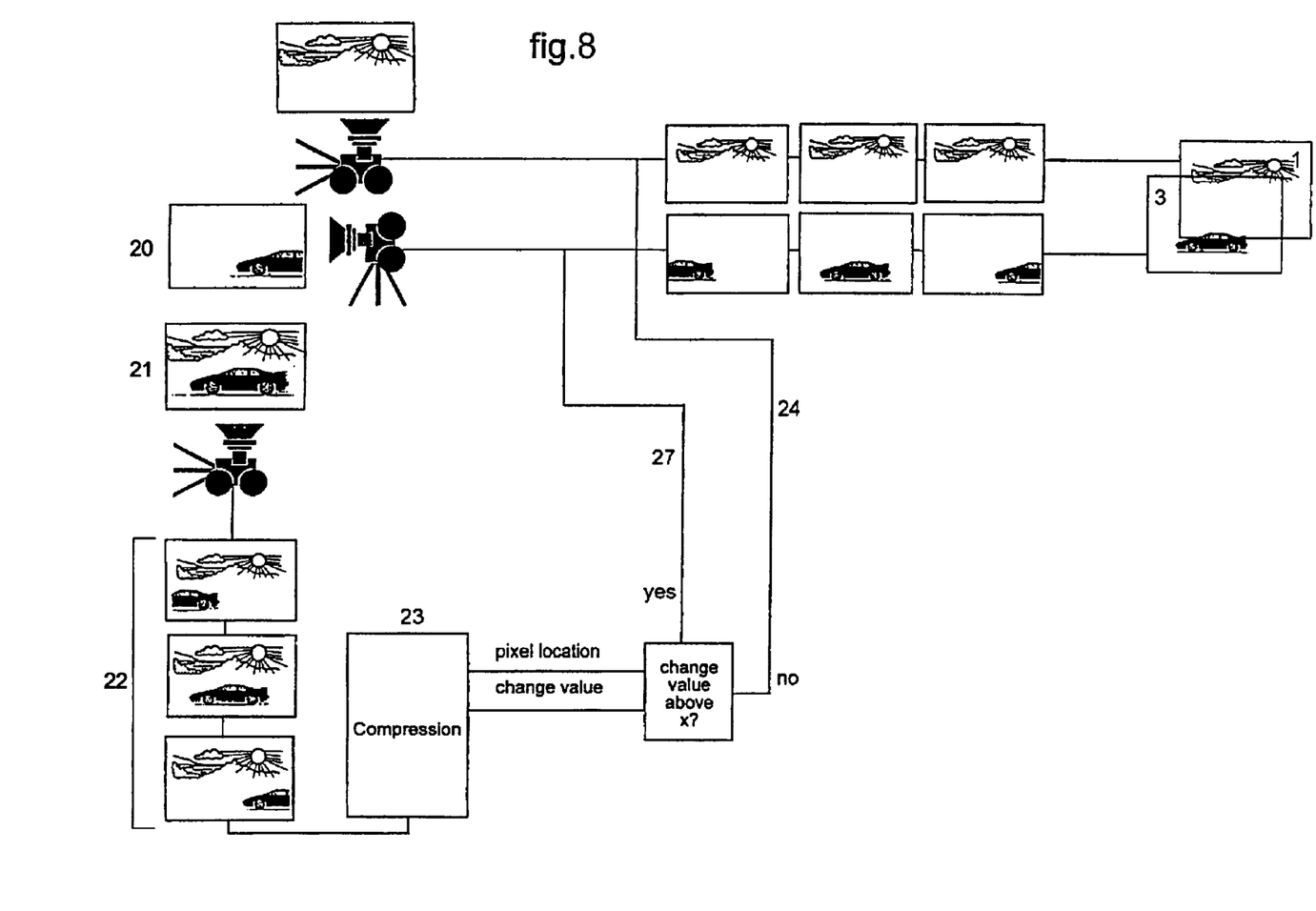
FIG. 8 illustrates a method of displaying images to each screen level in accordance with one embodiment of the present invention.

The general method of transmitting images to the screens is represented in FIG. 8. Image 19 is transmitted to the background screen 1. Image 20 is transmitted to the foreground screen 3.

Alternatively the separate video signal can be extracted from a single image using data produced by most common video compression algorithms. For example a video signal is transmitted of a car passing in front of a mountain 21, creates a sequence of frames 22. This sequence is fed through a video compression algorithm 23 which converts the image to a sequence of numbers representing pixel properties such as pixel colour, pixel location and amount of pixel motion between consecutive frames.

In this example, pixels with a change value above a threshold of X are sent via path 27 to the foreground screen 3 while pixels with a change value below X are sent via path 24 to the background screen 1. In the present implementation (FIG. 8) pixels representing the car have a high value for pixel change and will be directed to the foreground screen and the mountain having a pixel change value of less than X will be directed to the background screen.

It can be easily understood by those skilled in the art that the threshold value and tolerance of this value may be adjusted to gain a variety of outputs. In addition multiple threshold values may be defined in multi-layered displays with over two layers.

Thus, it can be seen from the foregoing detailed description and attached drawings that the present invention includes methods of displaying depth in a display allowing for motion parallax, true convergence, and wide angle of view without the viewing restrictions of prior art displays.

It can also be appreciated that taken individually each component enhances the depth of the display but may also operate independently and in combination to enhance traditional displays. It is obvious to someone skilled in the art that the following claims may be combined in various manners.

Aspects of the present invention have been described by way of example only and it should be appreciated that modifications and additions may be made thereto without departing from the scope thereof.

What is claimed is:

1. A multi-layered image display comprising:
   a first screen capable of generating a first image;
   a second screen capable of generating a second image, wherein the first screen is in front of the second screen; and
   a slightly diffuse layer between the first screen and the second screen, wherein the slightly diffuse layer is adapted to prevent observation of an interference pattern by an observer of the multi-layered image display.

2. The multi-layered image display of claim 1, wherein the first screen is a selectively transparent foreground screen capable of generating a foreground image and the second screen is a background screen capable of generating a background image.

3. The multi-layered image display of claim 1, wherein the first screen is a first selectively transparent foreground screen capable of generating a first foreground image and the second screen is a second selectively transparent foreground screen capable of generating a second foreground image.

4. The multi-layered image display of claim 1 further comprising a third screen, wherein the third screen is in front of the first screen.

5. The multi-layered image display of claim 4 further comprising a second slightly diffuse layer, wherein the second slightly diffuse layer is between the third screen and the first screen or second screen.

6. The multi-layered image display of claim 1 further comprising a refractor, wherein the refractor is between the first screen and the second screen.

7. The multi-layered image display of claim 6, wherein the refractor comprises a substantially optically clear material and wherein, the first screen, the second screen and the refractor have dimensions and an arrangement such that a line from an edge of the first screen to an edge of the second screen forms an angle of no less than 45 degrees with a face of the second screen.

8. The multi-layered image display of claim 6, wherein the refractor is a fresnel lens.

9. The multi-layered image display of claim 6, wherein the refractor is diffuse on a side facing the first screen or the second screen.

10. The multi-layered image display of claim 7, wherein the refractor is diffuse on a side facing the first screen or the second screen.

11. The multi-layered image display of claim 1, wherein a distance between the at least one first screen and the second screen is adjustable in real time.

12. A multi-layered image display comprising:
a first screen capable of displaying a first image having a first pixel alignment;
a second screen capable of displaying a second image having a second pixel alignment, wherein the first screen is in front of the second screen; and
the second pixel alignment is 45 degrees with the respect to the first pixel alignment.

13. The multi-layered image display of claim 12, wherein the first screen is a selectively transparent foreground screen capable of displaying a foreground image and the second screen is a background screen capable of displaying a background image.

14. The multi-layered image display of claim 12, wherein the first screen is a first selectively transparent foreground screen capable of displaying a first foreground image and the second screen is a second selectively transparent foreground screen capable of displaying a second foreground image.

15. A multi-layered image display comprising:
a first screen capable of displaying a first image;
a second screen capable of displaying a second image, wherein the first screen and the second screen are transmissive polarised display devices; there is no polariser on at least one face of at least the first screen or the second screen; and the first screen is in front of the second screen; and
at least one object between the first screen and the second screen capable of randomizing polarised light.

16. The multi-layered image display of claim 15, wherein the first screen is a selectively transparent foreground screen capable of displaying a foreground image and the second screen is a background screen capable of displaying a background image.

17. The multi-layered image display of claim 15, wherein the first screen is a first selectively transparent foreground screen capable of displaying a first foreground image and the second screen is a second selectively transparent foreground screen capable of displaying a second foreground image.

18. The multi-layered image display of one of claims 1, 12, or 15, wherein a selective diffuser layer between the first screen and the second to selectively diffuses light rendering at least one first image or portions thereof opaque.

19. The multi-layered image display of claim 15, wherein a selective diffuser layer between the first screen and the second screen selectively diffuses polarised light rendering at least one first image or portions thereof transparent.

20. The multi-layered image display of one of claims 1, 12, or 15, wherein the multi-layered image display is capable of receiving images representing image depth extracted from two-dimensional images by a video compression algorithm.

21. The multi-layered image display of claim 20, wherein the video compression algorithm assigns a depth to a pixel by determining an amount of change in the pixel from an image frame to a successive image frame.

22. The multi-layered image display of claim 20, wherein the video compression algorithm assigns a depth to a pixel by determining an amount of focus in a subset of pixels.

23. The multi-layered image display of claim 20, wherein the video compression algorithm assigns a depth to a pixel by determining an amount of sharpness in a subset of pixels.

24. The multi-layered image display of claim 1, wherein the first screen and the second screen are transmissive polarised display devices; there is no polariser on at least one face of at least the first screen or the second screen; and the first screen is in front of the second screen.

25. The multi-layered image display of claim 24, wherein the first screen is a selectively transparent foreground screen capable of displaying a foreground image and the second screen is a background screen capable of displaying a background image.

26. The multi-layered image display of claim 24, wherein the first screen is a first selectively transparent foreground screen capable of displaying a first foreground image and the second screen is a second selectively transparent foreground screen capable of displaying a second foreground image.

27. The multi-layered image display of claim 24, wherein a selective diffuser layer between the first screen and the second to selectively diffuses light rendering at least one first image or portions thereof opaque.

28. The multi-layered image display of claim 24, wherein a selective diffuser layer between the first screen and the second screen selectively diffuses polarised light rendering at least one first image or portions thereof transparent.

29. The multi-layered image display of claim 24, wherein the multi-layered image display is capable of receiving images representing image depth extracted from two-dimensional images by a video compression algorithm.

30. The multi-layered image display of claim 29, wherein the video compression algorithm assigns a depth to a pixel by determining an amount of change in the pixel from an image frame to a successive image frame.

31. The multi-layered image display of claim 29, wherein the video compression algorithm assigns a depth to a pixel by determining an amount of focus in a subset of pixels.

32. The multi-layered image display of claims 29, wherein the video compression algorithm assigns a depth to a pixel by determining an amount of sharpness in a subset of pixels.

* * * * *